US012117768B2

(12) United States Patent
Andoh et al.

(10) Patent No.: US 12,117,768 B2
(45) Date of Patent: Oct. 15, 2024

(54) IMAGE FORMING APPARATUS INCLUDING A FILTER FOR COLLECT FOREIGN SUBSTANCES IN AIR SUCKED INTO AT LEAST ONE INTAKE

(71) Applicants: Takayuki Andoh, Kanagawa (JP); Masahiro Samei, Kanagawa (JP); Kota Shiodera, Tokyo (JP); Hiroshi Yoshinaga, Chiba (JP); Toshiyuki Kabata, Kanagawa (JP); Tomoyuki Nishikawa, Saitama (JP)

(72) Inventors: Takayuki Andoh, Kanagawa (JP); Masahiro Samei, Kanagawa (JP); Kota Shiodera, Tokyo (JP); Hiroshi Yoshinaga, Chiba (JP); Toshiyuki Kabata, Kanagawa (JP); Tomoyuki Nishikawa, Saitama (JP)

(73) Assignee: Ricoh Company, Ltd., Toyko (JP)

( * ) Notice: Subject to any disclaimer, the term of this patent is extended or adjusted under 35 U.S.C. 154(b) by 13 days.

(21) Appl. No.: 18/163,591

(22) Filed: Feb. 2, 2023

(65) Prior Publication Data

US 2023/0297026 A1 Sep. 21, 2023

(30) Foreign Application Priority Data

Mar. 17, 2022 (JP) ................................ 2022-042530
Nov. 29, 2022 (JP) ................................ 2022-190324

(51) Int. Cl.
*G03G 21/20* (2006.01)
*G03G 15/20* (2006.01)

(52) U.S. Cl.
CPC ....... *G03G 21/206* (2013.01); *G03G 15/2053* (2013.01)

(58) Field of Classification Search
CPC .................................................. G03G 21/206
See application file for complete search history.

(56) References Cited

U.S. PATENT DOCUMENTS

2006/0257183 A1 11/2006 Ehara et al.
2007/0196152 A1 8/2007 Shimizu et al.
(Continued)

FOREIGN PATENT DOCUMENTS

JP 2007-156418 6/2007
JP 2014-224848 12/2014
(Continued)

OTHER PUBLICATIONS

JP_2016206347_A_t Machine Translation, Japan, 2016, Shiiki et al.*

*Primary Examiner* — Victor Verbitsky
(74) *Attorney, Agent, or Firm* — Harness, Dickey & Pierce P.L.C.

(57) ABSTRACT

An image forming apparatus includes a heating device, a recording medium ejector, a recording medium tray, an outer wall having an intake, and a filter. The heating device heats a recording medium having an image on one side of the recording medium. The recording medium ejector ejects the recording medium with the one side facing downward. On the recording medium tray, the recording medium ejected by the recording medium ejector is stacked. The intake is open toward the recording medium tray and is disposed at a position below the recording medium ejector. At the position, a maximum amount of recording media placeable on the recording medium tray does not cover at least a part of the intake. The filter collects foreign substances in air sucked from the intake.

20 Claims, 8 Drawing Sheets

(56) References Cited

U.S. PATENT DOCUMENTS

| | | | |
|---|---|---|---|
| 2008/0175620 | A1 | 7/2008 | Ohta et al. |
| 2008/0181695 | A1 | 7/2008 | Andoh et al. |
| 2008/0181698 | A1 | 7/2008 | Andoh et al. |
| 2008/0317498 | A1 | 12/2008 | Andoh et al. |
| 2017/0010582 | A1 | 1/2017 | Kojima et al. |
| 2018/0024462 | A1 | 1/2018 | Shimada et al. |
| 2020/0050144 | A1 | 2/2020 | Kabata et al. |
| 2021/0096509 | A1 | 4/2021 | Ishikawa et al. |
| 2022/0026834 | A1 | 1/2022 | Yoshinaga |
| 2022/0373966 | A1* | 11/2022 | Nakayama ........... G03G 21/206 |
| 2022/0377197 | A1 | 11/2022 | Samei |

FOREIGN PATENT DOCUMENTS

| | | |
|---|---|---|
| JP | 2015-222286 | 12/2015 |
| JP | 2016-184147 | 10/2016 |
| JP | 2016-206347 | 12/2016 |
| JP | 2017-032836 | 2/2017 |
| JP | 2017-173491 | 9/2017 |
| JP | 2021-056349 | 4/2021 |

* cited by examiner

IMAGE FORMING APPARATUS INCLUDING A FILTER FOR COLLECT FOREIGN SUBSTANCES IN AIR SUCKED INTO AT LEAST ONE INTAKE

CROSS-REFERENCE TO RELATED APPLICATIONS

This patent application is based on and claims priority pursuant to 35 U.S.C. § 119(a) to Japanese Patent Applications No. 2022-042530, filed on Mar. 17, 2022, and No. 2022-190324, filed on Nov. 29, 2022, in the Japan Patent Office, the entire disclosures of which are hereby incorporated by reference herein.

BACKGROUND

Technical Field

Embodiments of the present disclosure relate to an image forming apparatus.

Related Art

An image forming apparatus such as a copier or a printer includes a device to remove foreign substances such as ultrafine particles (UFP) and volatile organic compounds (VOC) from exhaust gas.

SUMMARY

This specification describes an improved image forming apparatus that includes a heating device, a recording medium ejector, a recording medium tray, an outer wall having an intake, and a filter. The heating device heats a recording medium having an image on one side of the recording medium. The recording medium ejector ejects the recording medium with the one side facing downward. On the recording medium tray, the recording medium ejected by the recording medium ejector is stacked. The intake is open toward the recording medium tray and disposed at a position below the recording medium ejector. At the position, a maximum amount of recording media placeable on the recording medium tray does not cover at least a part of the intake. The filter collects foreign substances in air sucked from the intake.

This specification also describes an improved image forming apparatus that includes a heating device, a recording medium ejector, a duct having an intake, and a filter. The heating device heats a recording medium having an image on one side of the recording medium. The recording medium ejector ejects the recording medium with the one side facing downward. The intake faces the one side of the recording medium conveyed from the heating device to the recording medium ejector. The filter collects at least one of fine particles or ultrafine particles in air sucked from the intake.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
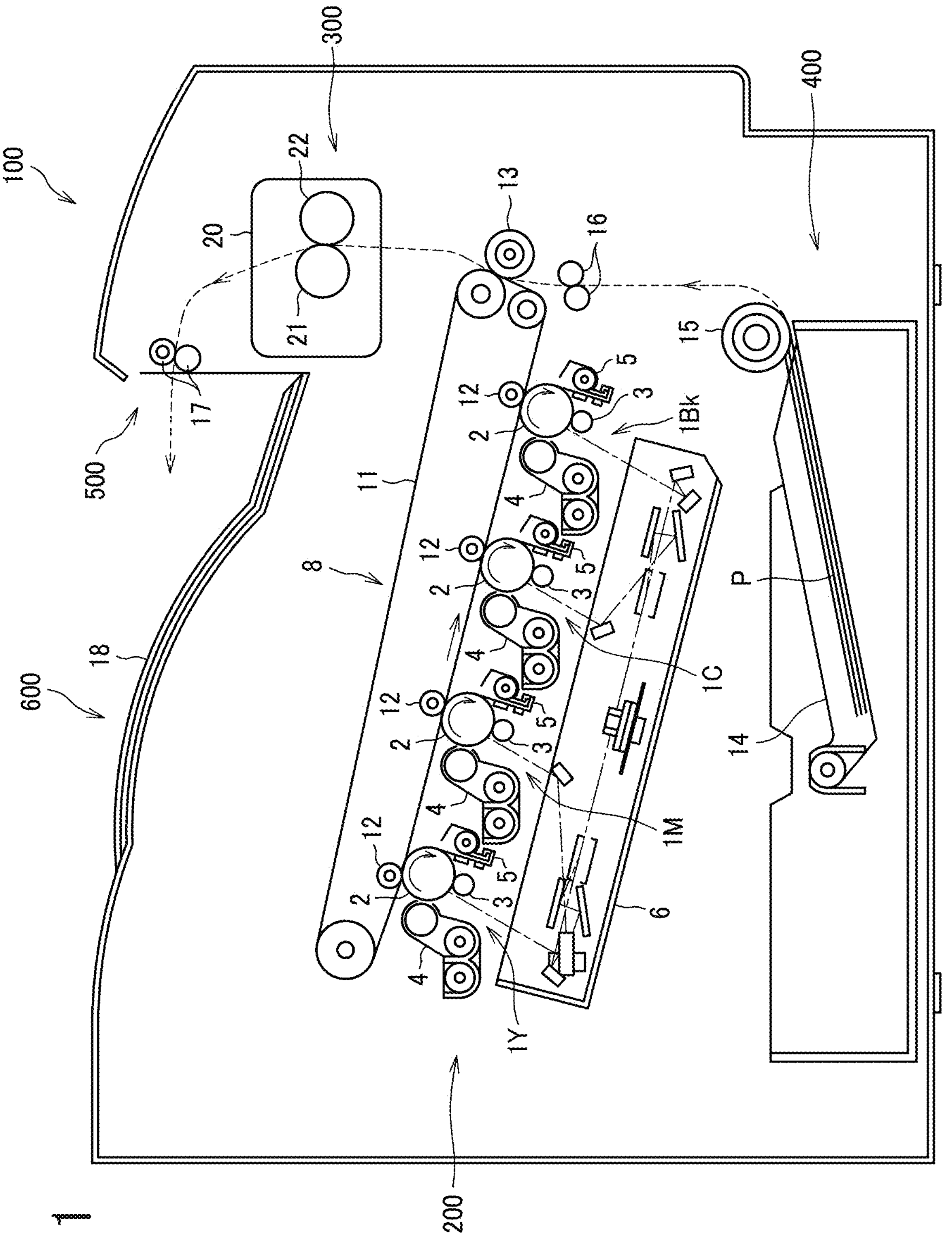
FIG. 1 is a schematic view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise. In the drawings illustrating embodiments of the present disclosure, elements or components having identical or similar functions or shapes are given similar reference numerals as far as distinguishable, and redundant descriptions are omitted.

FIG. 1 is a schematic view of an image forming apparatus 100 according to an embodiment of the present disclosure. In the following description, the "image forming apparatus" includes a printer, a copier, a scanner, a facsimile machine, or a multifunction peripheral having at least two of printing, copying, scanning, and facsimile functions. The term "image formation" indicates an action for providing (i.e., printing) not only an image having a meaning, such as texts and figures on a recording medium, but also an image having no meaning, such as patterns on the recording medium. Initially, with reference to FIG. 1, a description is given of an overall configuration and operation of the image forming apparatus 100 according to the embodiment of the present disclosure.

As illustrated in FIG. 1, the image forming apparatus 100 according to the present embodiment includes an image forming section 200 to form an image on a sheet-shaped recording medium such as a sheet, a fixing section 300 to fix the image onto the recording medium, a recording medium feeder 400 to feed the recording medium to the image forming section 200, a recording medium ejector 500 to eject the recording medium to an outside of the image forming apparatus 100, and a recording medium tray 600 on which the ejected recording medium is stacked.

The image forming section 200 includes four process units 1Y, 1M, 1C, and 1Bk as image forming units, an exposure device 6 to form an electrostatic latent image on a photoconductor 2 in each of the process units 1Y, 1M, 1C, and 1Bk, and a transfer device 8 to transfer an image onto the recording medium.

The process units 1Y, 1M, 1C, and 1Bk have the same configuration except for containing different color toners (developers), i.e., yellow (Y), magenta (M), cyan (C), and black (Bk) toners, respectively, corresponding to decomposed color separation components of full-color images. Specifically, each of the process units 1Y, 1M, 1C, and 1Bk includes the photoconductor 2 serving as an image bearer bearing the image on the surface thereof, a charger 3 to charge the surface of the photoconductor 2, a developing device 4 to supply the toner as the developer to the surface of the photoconductor 2 to form a toner image, and a cleaner 5 to clean the surface of the photoconductor 2.

The transfer device 8 includes an intermediate transfer belt 11, primary transfer rollers 12, and a secondary transfer roller 13. The intermediate transfer belt 11 is an endless belt stretched by a plurality of support rollers. Four primary transfer rollers 12 are disposed inside a loop of the intermediate transfer belt 11. Each of the primary transfer rollers 12 is in contact with the corresponding photoconductor 2 via the intermediate transfer belt 11 to form a primary transfer nip between the intermediate transfer belt 11 and each photoconductor 2. The secondary transfer roller 13 is in contact with the outer circumferential surface of the intermediate transfer belt 11 to form a secondary transfer nip.

The fixing section 300 includes a fixing device 20 as a heating device that heats the recording medium bearing the transferred image. The fixing device 20 includes a fixing rotator 21 and a pressure rotator 22. The fixing rotator 21 heats the image on the recording medium. The pressure rotator 22 is in contact with an outer circumferential surface of the fixing rotator 21 to form a nip (that is called a fixing nip).

The recording medium feeder 400 includes a sheet tray 14 to store sheets P as recording media and a feed roller 15 to feed the sheet P from the sheet tray 14. The "recording medium" is described as a "sheet" in the following embodiments but is not limited to the sheet. Examples of the "recording medium" include not only the sheet of paper but also an overhead projector (OHP) transparency sheet, a fabric, a metallic sheet, a plastic film, and a prepreg sheet including carbon fibers previously impregnated with resin. Examples of the "sheet" include thick paper, a postcard, an envelope, thin paper, coated paper (e.g., coat paper and art paper), and tracing paper, in addition to plain paper.

The recording medium ejector 500 includes an output roller pair 17 to eject the sheet P to the outside of the image forming apparatus 100.

The recording medium tray 600 includes an output tray 18 to place the sheet P ejected by the output roller pair 17.

Next, printing operations of the image forming apparatus 100 according to the present embodiment are described with reference to FIG. 1.

When the image forming apparatus 100 starts the printing operations, the photoconductors 2 of the process units 1Y, 1M, 1C, and 1Bk and the intermediate transfer belt 11 of the transfer device 8 start rotating. The feed roller 15 starts rotating to feed the sheet P from the sheet tray 14. The sheet P fed from the sheet tray 14 is brought into contact with a timing roller pair 16 and temporarily stopped until the image forming section 200 forms the image to be transferred to the sheet P.

In each of the process units 1Y, 1M, 1C, and 1Bk, the charger 3 uniformly charges the surface of the photoconductor 2 at a high electric potential. According to image data of a document read by a document reading device or print data instructed to print by a terminal, the exposure device 6 exposes the charged surface of each of the photoconductors 2. As a result, the electric potential at an exposed portion on the surface of each of the photoconductors 2 is decreased. Thus, an electrostatic latent image is formed on the surface of each of the photoconductors 2. The developing device 4 supplies toner to the electrostatic latent image formed on the photoconductor 2, forming the toner image thereon. When the toner images formed on the photoconductors 2 reach the primary transfer nips defined by the primary transfer rollers 12 with the rotation of the photoconductors 2, the toner images formed on the photoconductors 2 are transferred onto the intermediate transfer belt 11 rotated counterclockwise in FIG. 1 successively such that the toner images are superimposed on the intermediate transfer belt 11, forming a full color toner image thereon. Thus, the full color toner image is formed on the intermediate transfer belt 11. The image forming apparatus 100 can form a monochrome toner image by using any one of the four process units 1Y, 1M, 1C, and 1Bk, or can form a bicolor toner image or a tricolor toner image by using two or three of the process units 1Y, 1M, 1C, and 1Bk. After the toner image is transferred onto the intermediate transfer belt 11, the cleaner 5 removes residual toner from the photoconductor 2. The residual toner refers to toner that has failed to be transferred onto the intermediate transfer belt 11 and therefore remains on the surface of the photoconductor 2.

In accordance with rotation of the intermediate transfer belt 11, the full color toner image transferred onto the intermediate transfer belt 11 reaches the secondary transfer nip defined by the secondary transfer roller 13 and is transferred onto the sheet P conveyed by the timing roller pair 16 at the secondary transfer nip. The sheet P bearing the toner image is conveyed to the fixing device 20. The sheet P conveyed to the fixing device 20 enters the fixing nip between the fixing rotator 21 and the pressure rotator 22 and is nipped and conveyed by the fixing rotator 21 and the pressure rotator 22.

At this time, heat and pressure applied to the toner image on the sheet P fixies the toner image onto the sheet P. Thereafter, the sheet P is conveyed to the recording medium ejector 500 and ejected to the output tray 18 by the output roller pair 17. Thus, a series of printing operations is completed.

When the fixing device 20 in the image forming apparatus 100 according to the present embodiment heats the sheet, the wax included in the toner on the sheet is volatilized to generate ultrafine particles (UFP) or a volatile organic compound (VOC). In addition, increase in the temperature of the fixing device 20 itself increase the temperature of lubricant such as silicone oil or fluorine grease in the fixing device 20, which generates fine particles (FP) and ultrafine particles (UFP) such as siloxane contained in the lubricant.

Currently, due to an increase in awareness of environmental issues, measures for reducing foreign substances discharged from products, such as the volatile organic compounds, the fine particles, and the ultrafine particles are desired. In the image forming apparatuses, reducing the foreign substances discharged to the air is also desired. For example, the German Blue Angel standard establishes reference values for the number of generated fine particles and ultrafine particles having a particle diameter of 5.6 nm to 560 nm (number/10 minutes). For this reason, the image forming apparatus according to the present embodiment includes the following configuration to remove at least one of foreign substances that are the volatile organic compounds, the fine particles, and the ultrafine particles.

Figure 2:
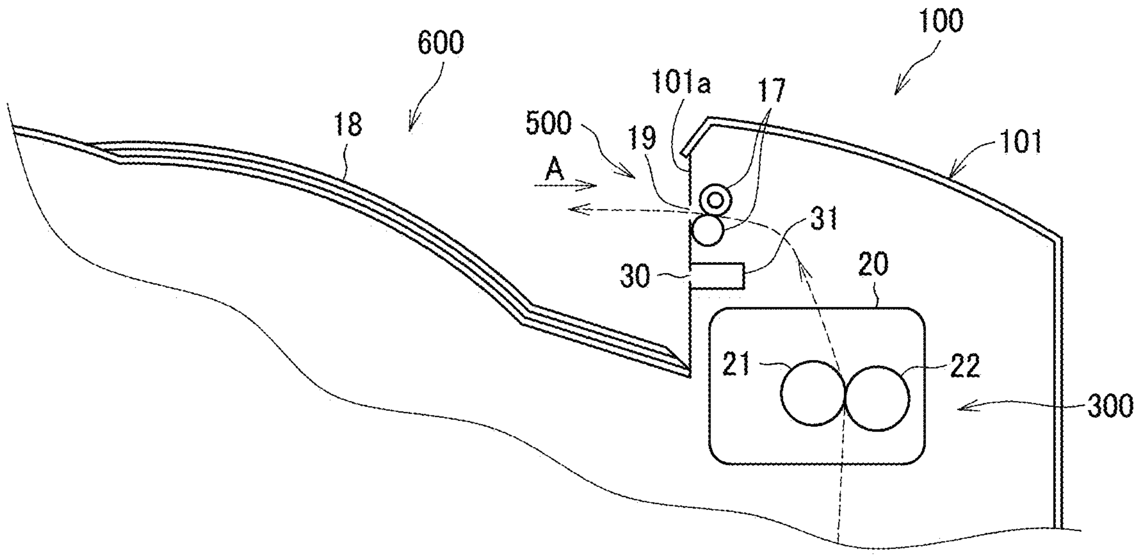
FIG. 2 is an enlarged partial schematic view of a recording medium ejector and a peripheral portion thereof in the image forming apparatus of FIG. 1.

FIG. 2 is an enlarged partial schematic view of a recording medium ejector and a peripheral portion thereof in the image forming apparatus according to the present embodiment.

As illustrated in FIG. 2, the image forming apparatus 100 according to the present embodiment includes a duct 31 having intakes 30 in the vicinity of the recording medium ejector 500. The duct 31 is below the output roller pair 17. The intakes 30 are below a sheet ejection port (a recording medium ejection port) 19 through which the sheet P is ejected. The recording medium ejector 500 is not limited to the configuration including the output roller pair 17 and having the sheet ejection port 19. The recording medium ejector 500 may have only the sheet ejection port 19.

Figure 3:
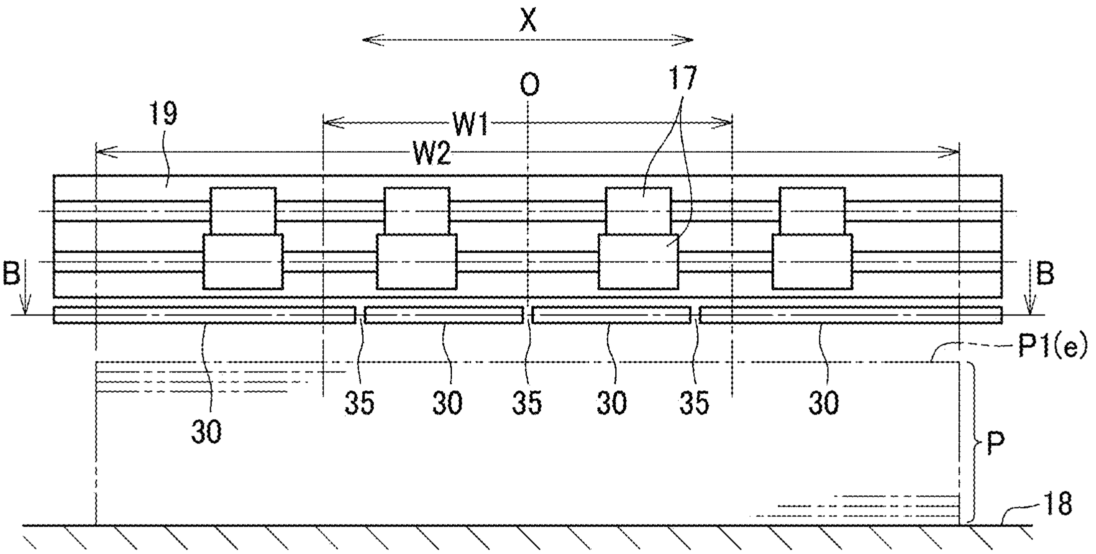
FIG. 3 is a view of intakes viewed from a direction indicated by an arrow A in FIG. 2.

FIG. 3 is a view of the intakes 30 viewed from a direction indicated by an arrow A in FIG. 2.

As illustrated in FIG. 3, a plurality of intakes 30 are disposed below the sheet ejection port 19 and over the length of the sheet ejection port 19 in a width direction X. The above-described width direction X of the sheet ejection port 19 means a width direction of the sheet orthogonal to a sheet conveyance direction and is the same direction as rotation axis directions of the output roller pair 17. In the following description, The above-described width direction X of the sheet ejection port 19 is referred to as the width direction X.

Each intake 30 is in an outer wall surface 101*a* (see FIG. 2) of an image forming apparatus body 101. The outer wall surface 101*a* faces the recording medium tray 600. Each intake 30 opens toward the recording medium tray 600. Between intakes 30, an entry preventing portion 35 is disposed to prevent the sheet P from entering the intake 30. In other words, entry preventing portions 35 separate an intake in the width direction to form the plurality of intakes 30. If the ejected sheet P moves toward the intakes 30, the entry preventing portions 35 come into contact with the sheet and prevent the sheet from entering the intakes 30.

In the present embodiment, the entry preventing portions 35 are disposed at the center position O in the width direction of a sheet ejected region (that is, a recording medium passing region) and at positions symmetrical with respect to the center position O in the width direction. However, the shape and number of the entry preventing portions 35 may be appropriately changed. However, in order to reliably prevent the sheet from entering the intakes 30, the entry preventing portion 35 is preferably disposed at least in a minimum recording-medium passing region W1 that is a region from which the sheet having the smallest width of widths of sheets used in the fixing device is ejected.

Figure 4:
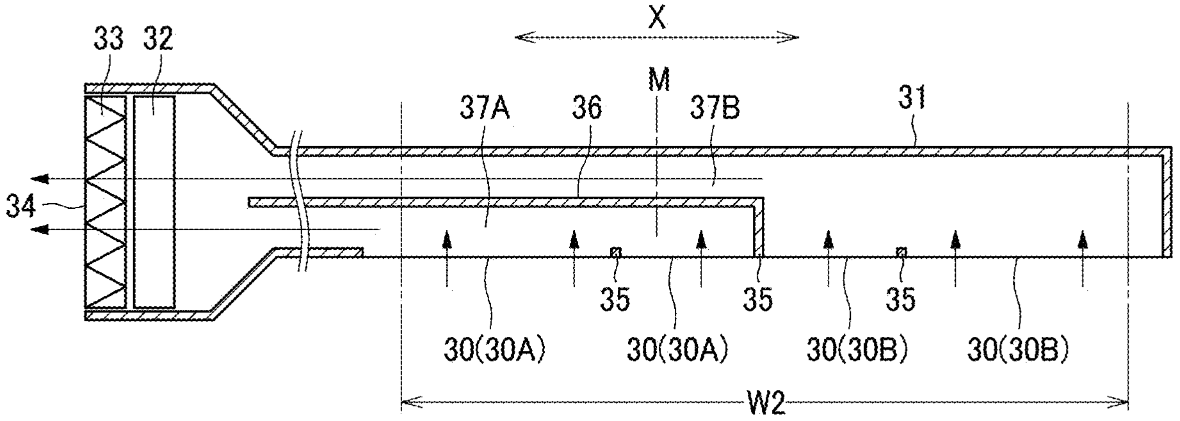
FIG. 4 is a cross sectional view of a duct along a line B-B in FIG. 3.

FIG. 4 is a cross sectional view of the duct 31 along a line B-B in FIG. 3.

As illustrated in FIG. 4, The duct 31 includes a fan 32 as a suction device and a filter 33 to collect at least one foreign substances, that is, the volatile organic compounds, the fine particles, and the ultrafine particles that are contained in the air. The fan 32 may be a known fan such as a propeller fan, a sirocco fan, or a cross-flow fan. The duct 31 extends in the width direction X in FIG. 4. The duct 31 has an exhaust port 34 at one end of the duct 31 in the width direction X (the left end of the duct 31 in FIG. 4). The fan 32 and the filter 33 are disposed nearer to the exhaust port 34 than to the center M of the duct 31 in the width direction M.

In addition, the duct 31 includes a partition 36 extending from between the intakes 30 as illustrated in FIG. 4. The partition 36 extends from between an intake 30A that is the second intake 30 from the left in FIG. 4 and an intake 30B that is the third intake 30 from the left in FIG. 4 toward the exhaust port 34. In other words, the partition 36 extends from between the intakes 30 disposed adjacent to each other among some intakes 30 toward the exhaust port 34. The intakes 30 are referred to as a first intakes 30. The partition 36 divides a space in the duct 31 into two flow paths, that is, a first flow path 37A communicating with the two intakes 30A on the left side in FIG. 4 and a second flow path 37B communicating with the two intakes 30B on the right side in FIG. 4.

Figure 5:
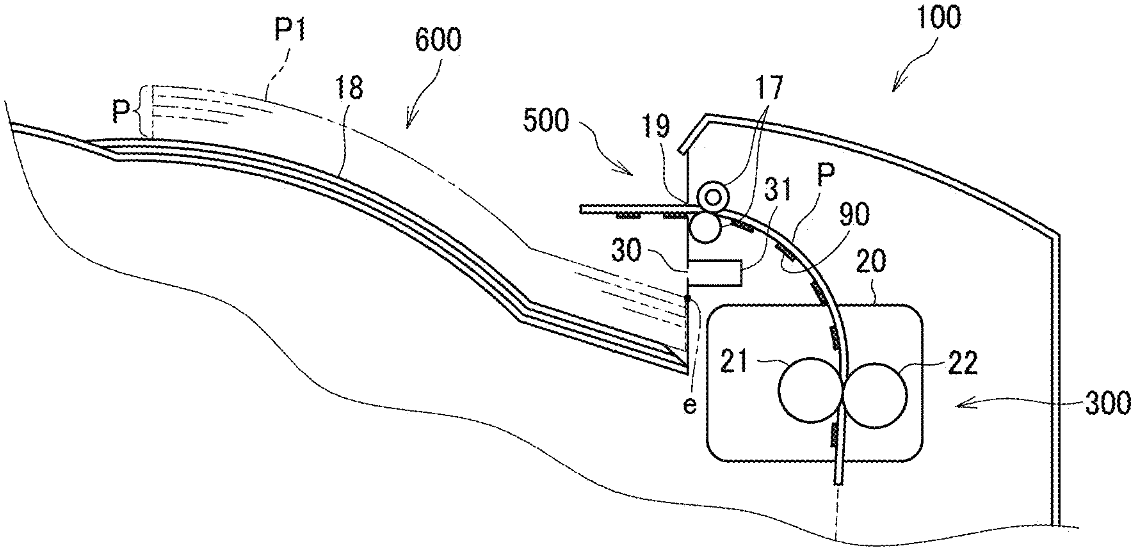
FIG. 5 is an enlarged partial schematic view of a recording medium ejector ejecting a sheet in the image forming apparatus of FIG. 1.

FIG. 5 is an enlarged partial schematic view of the recording medium ejector 500 ejecting the sheet P in the image forming apparatus 100 according to the present embodiment.

As illustrated in FIG. 5, the image forming apparatus 100 according to the present embodiment employs a so-called face-down ejection method. In the face-down ejection method, an image formation surface 90 of the sheet P is a lower side of the sheet P when the image forming apparatus forms the toner image on one side of the sheet P and ejects the sheet P. In other words, the recording medium ejector 500 ejects the sheet P with the one side facing downward after the fixing device 20 heats the toner image formed on the one side of the sheet P.

In the image forming apparatus 100 according to the present embodiment, since the intakes 30 are disposed below the sheet ejection port 19 of the recording medium ejector 500 as described above, the recording medium ejector 500 ejects the sheet P having the toner image on the one side so that the image formation surface 90 faces the intakes 30 (in other words, faces a space below the sheet ejection port 19). The foreign substances such as the volatile organic compounds generated from the image formation surface 90 diffuse into the air between the sheet P and the intakes 30.

In other words, the sheet P is not between the image formation surface 90 generating the foreign substances and the intakes 30. The ejected sheet P does not disturb suction of the foreign substances. As a result, the foreign substances are effectively sucked through the intakes 30 in the present embodiment.

The image forming apparatus 100 according to the present embodiment can effectively reduce the amount of the foreign substances discharged to the outside of the image forming apparatus because, as described above, the sheet P is not between the intakes 30 and the foreign substances contained in the air, and the foreign substances in the air are effectively sucked through the intakes 30.

In addition, as illustrated in FIG. 3, since the intakes 30 are arranged along a substantially entire lower end of the sheet ejection port 19 in the width direction X, the foreign substances discharged from the sheet ejection port 19 to the air can be efficiently sucked. In particular, in order to efficiently suck the foreign substances generated from the sheet ejected from the sheet ejection port 19, the intakes 30 preferably cover a range larger than a maximum recording-medium passing region that is a region W2 from which the sheet having the largest width of widths of the sheets used in the fixing device is ejected.

The intakes 30 in the present embodiment disposed below the sheet ejection port 19 of the recording medium ejector 500 as described above may be closed by a large number of ejected sheets P (a sheet bundle) stacked on the output tray 18. If the entire intakes 30 are closed by the sheets stacked on the output tray 18, the suction from the intakes 30 cannot be performed.

To avoid the above, at least a part of the intakes 30 is positioned so that the maximum amount of sheets (the sheet bundle) stacked on the output tray 18 do not cover the at least a part of the intakes 30. As illustrated in FIG. 2, since the output tray 18 in the present embodiment is inclined upward from a side close to the sheet ejection port 19 to a side far from the sheet ejection port 19, the sheets P placed on the output tray 18 are obliquely disposed along the output tray 18. In order to prevent the intakes 30 from being covered, at least a part of the intakes 30 is disposed above an edge e (see FIG. 5) of the uppermost sheet P1 of the maximum amount of sheets P stacked on the output tray 18, the edge e adjacent to the intake 30. The uppermost position of the maximum amount of sheets P can be detected by an optical sensor or the like as a full stack detection device. Note that, in the present embodiment, a maximum amount of recording media such as the sheets P placeable on the recording medium tray such as the output tray 18 is defined as the maximum amount of recording media detected by the optical sensor or the like as the full stack detection device or the maximum amount of recording media written in a catalog or a manual of the image forming apparatus.

Regarding the position of the intake 30 with respect to the maximum amount of sheets P, the entire intake 30 in the present embodiment is disposed above the edge e of the uppermost sheet P1, the edge e adjacent to the intake 30 (see FIGS. 3 and 5). The above-described intake 30 in the present embodiment has an open area enough to effectively reduce the foreign substances in the air. In order to sufficiently ensure a suction performance, a half or more of the intake 30 is preferably disposed above the edge e of the uppermost sheet P1, the edge e adjacent to the intake 30.

The above-described configuration according to the present embodiment can reduce the size of the image forming apparatus and saves the space to place the image forming apparatus in addition to effective reduction of foreign substances. As illustrated in FIG. 4, positioning the fan 32 and the filter 33 in the present embodiment to be closer to the end of the duct 31 in the width direction X than to the center M of the duct 31 enables positioning the fan 32 and the filter 33 outside a maximum sheet-passing region (the maximum recording-medium-passing region) W2. The fan 32 and the filter 33 are placed in a relatively large installation space. The above-described configuration can avoid placing the fan 32 and the filter 33 in the sheet conveyance path, and the elongated duct 31 is disposed in the vicinity of the sheet conveyance path. As a result, the above-described configuration can reduce the size of the image forming apparatus and save the space to place the image forming apparatus. Although the fan 32 and the filter 33 are disposed on the left side of the duct 31 in FIG. 4, the fan 32 and the filter 33 may be disposed on the opposite side (that is, the right side of the duct 31 in FIG. 4).

The fan 32 and the filter 33 in the present embodiment are disposed at the one end of the duct 31 in order to reduce the size of the image forming apparatus and save the space for placing the image forming apparatus as described above. However, the fan 32 disposed at the one end of the duct 31 tends to cause the intake amount to be larger at the intake 30 close to the fan 32 than at the intake 30 far from the fan 32. As a result, the fan 32 disposed at the one end of the duct 31 may cause variation in amounts of intake air in the width direction X.

To reduce the variation, as illustrated in FIG. 4, the duct 31 in the present embodiment includes the partition 36. The partition 36 divides a flow path in the duct 31 into the first flow path 37A communicating with the intakes 30A close to the fan 32 and the second flow path 37B communicating with the intakes 30B far from the fan 32. The first flow path 37A and the second flow path 37B that are independent flow paths guide the air sucked from the intakes 30A close to the fan 32 and the air sucked from the intakes 30B far from the fan 32, respectively, which reduces the variation in the amount of intake air in the width direction X. As a result, the fan 32 in the present embodiment can effectively suck the air including the foreign substances from the intakes 30 arranged along the width direction X. Although the flow path in the duct 31 extending in the width direction X is divided into two flow paths (that is, the first flow path 37A and the second flow path 37B) in FIG. 4, the number of the partitions 36 may be increased to divide the flow path extending in the width direction X into three or more flow paths.

Other embodiments of the present disclosure are described below. Differences from the above-described embodiment are mainly described below, and descriptions of other parts similar to the above-described embodiment are omitted below as appropriate.

Figure 6:
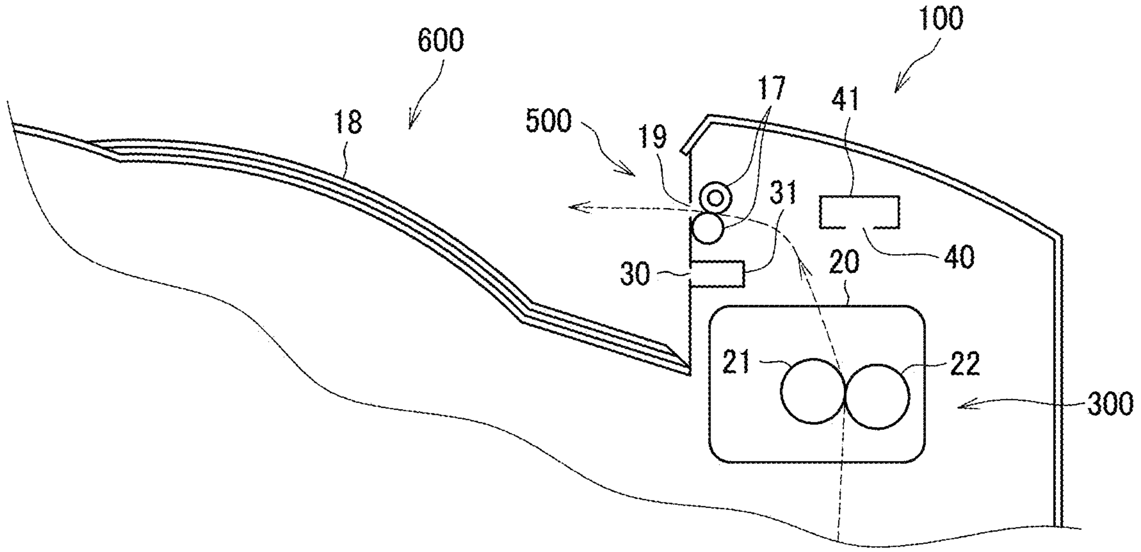
FIG. 6 is an enlarged partial schematic view of a recording medium ejector and a peripheral portion thereof in the image forming apparatus according to a second embodiment.

FIG. 6 is an enlarged partial schematic view of a recording medium ejector and a peripheral portion thereof in the image forming apparatus according to a second embodiment.

As illustrated in FIG. 6, the image forming apparatus in the second embodiment includes a duct 41 having an intake 40 above the fixing device 20 in addition to the duct 31 having the intakes 30 below the recording medium ejector 500. Hereinafter, the intake 30 below the recording medium ejector 500 is referred to as a first intake 30, and the intake 40 above the fixing device 20 is referred to as a second intake 40. The second intake 40 is in the lower side of the duct 41 so that the second intake 40 faces the fixing device 20.

The second intake 40 disposed above the fixing device 20 as described above enables the fan 32 to suck at least one foreign substances generated in the fixing device 20 that are the volatile organic compounds, the fine particles, and the ultrafine particles through the second intake 40. As a result, foreign substances in the air generated in the vicinity of the fixing device 20 can also be removed, which further reduces the amount of foreign substances discharged to the outside of the image forming apparatus.

Figure 7:
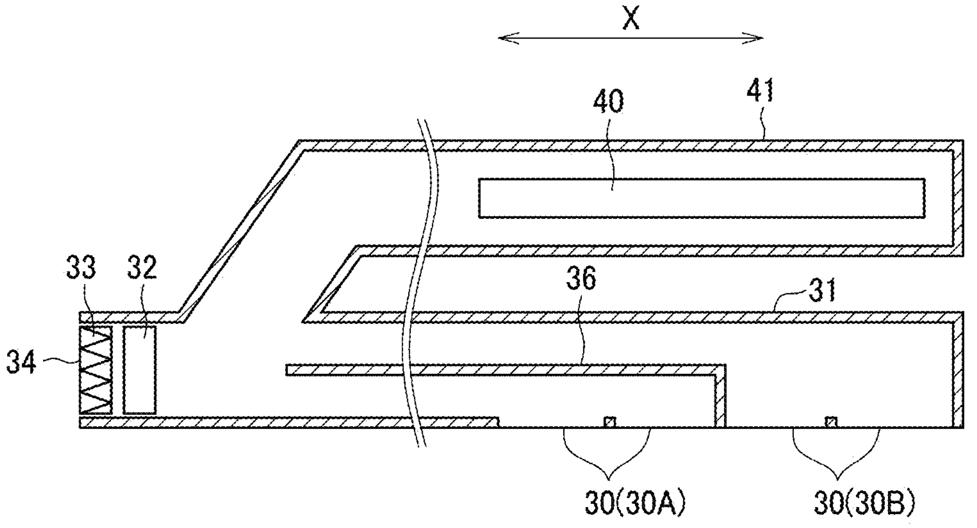
FIG. 7 is a cross-sectional view of a duct connecting a first intake and a second intake.

A dedicated fan may be used to suck the air including the foreign substances through the second intake 40, and a dedicated filter may be used to collect and remove the foreign substances from the air. However, a common fan may be used to suck the air through the first intake 30 and the second intake 40, and a common filter may be used to collect and remove the foreign substances. As illustrated in FIG. 7, the duct 41 having the second intake and the duct 31 having the first intake 30 may be connected to each other. In the above configuration, one fan 32 is used to suck the air including the foreign substances through each of the first intake 30 and the second intake 40, and one filter 33 is used to collect the foreign substances from the air. The above configuration not including additional fan and filter can downsize the image forming apparatus and save the space to place the image forming apparatus.

Figure 8:
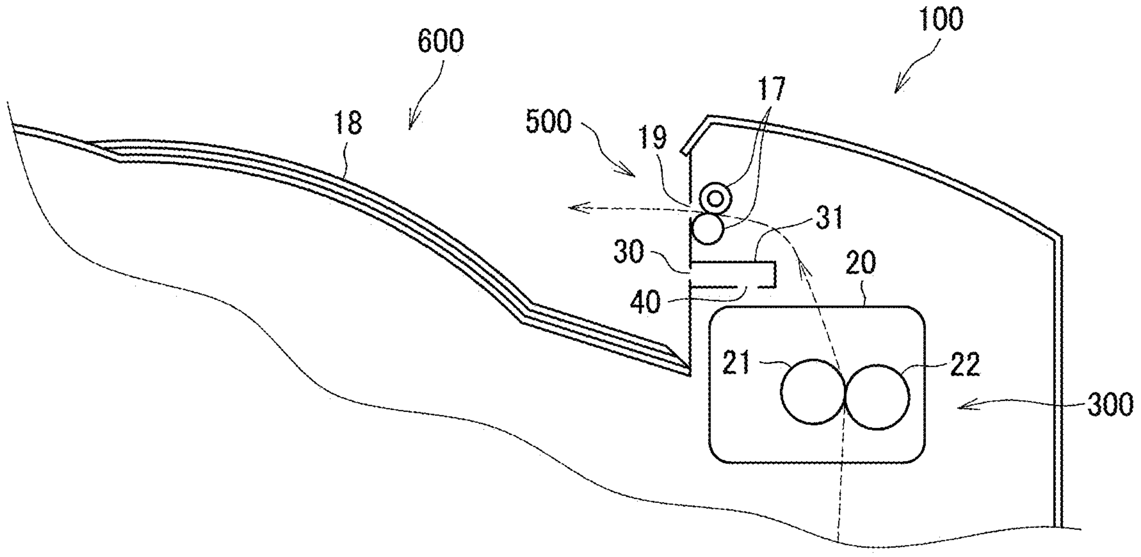
FIG. 8 is an enlarged partial schematic view of a recording medium ejector and a peripheral portion thereof in the image forming apparatus according to a third embodiment.

FIG. 8 is an enlarged partial schematic view of a recording medium ejector and a peripheral portion thereof in the image forming apparatus according to a third embodiment.

In the third embodiment illustrated in FIG. 8, the duct 31 has the second intakes 40 to suck the air including the foreign substances generated from the fixing device 20 in addition to the first intakes 30.

The second intakes 40 are disposed in the lower face of the duct 31 so that the second intakes 40 face the fixing device 20.

A large amount of foreign substances generated from the fixing device 20 and diffused into the air tends to be generated mainly from both end portions of the fixing device in the width direction X. This is because temperature increase in lubricant such as silicone oil or fluorine grease applied to both end portions of the fixing rotator 21 and the pressure rotator 22 generates fine particles and ultrafine particles of siloxane or the like contained in the lubricant.

Figure 9:
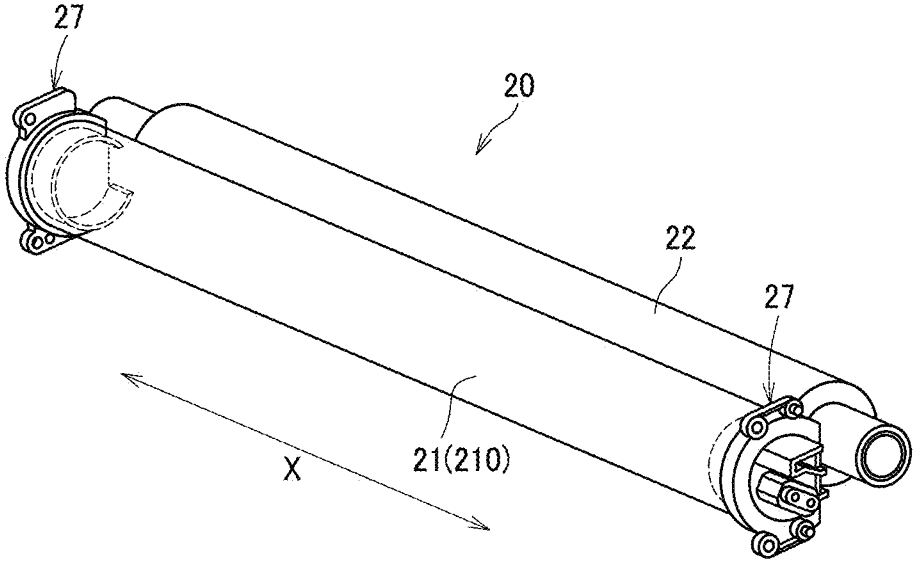
FIG. 9 is a perspective view of belt holders holding both ends of a fixing belt in a longitudinal direction thereof.

For example, one type of fixing rotator 21 is configured by an endless fixing belt 210 illustrated in FIG. 9, and both ends of the fixing belt 210 in a longitudinal direction of the fixing belt 210 are held by a pair of belt holders 27 as a rotator holders. In this configuration, the lubricant such as silicone oil or fluorine grease is generally applied between the inner circumferential surface of the fixing belt 210 and the belt holders 27. Note that the longitudinal direction of the fixing belt 210 means the same direction as the width direction of the sheet and the direction indicated by the arrow X in FIG. 9.

As described above, the fixing device 20 including a rotator such as the fixing belt 210 generally includes the rotator holders such as the belt holders 27 to hold both ends of the rotator in the longitudinal direction of the rotator and the lubricant applied between the rotator and the rotator holders to reduce rotational friction. Temperature increase in the rotator and the rotator holders increases the temperature of the lubricant, which generates the foreign substances such as the volatile organic compounds, the fine particles, and the ultrafine particles from the end portions of the fixing device 20 in the width direction X.

Figure 10:
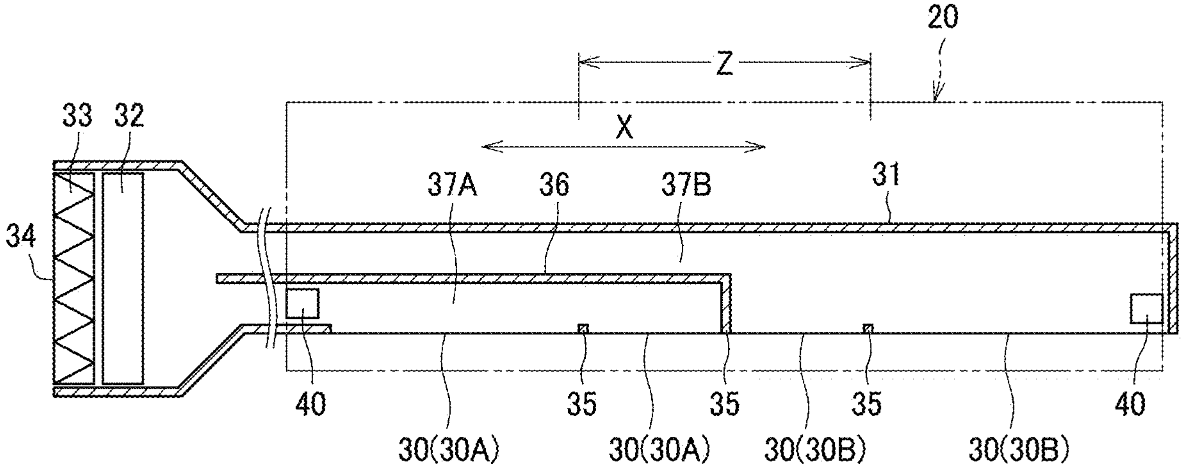
FIG. 10 is a cross-sectional view of a duct having second intakes at both end portions of a fixing device.

To collect the foreign substances, the duct 31 of the fixing device 20 in the third embodiment of the present disclosure has the second intakes 40 at both end portions of the duct 31 in the width direction X as illustrated in FIG. 10. The second intakes 40 face both end portions of the fixing device 20 in the width direction X, respectively. The above-described both end portions of the fixing device 20 are both sides of the center portion Z formed when the fixing device 20 is equally divided into three in the width direction X. In other words, each of the end portions of the fixing device 20 has a length of one third of a total length of the fixing device 20. The above-described configuration can effectively suck the air including the foreign substances generated from the end portions of the fixing device in the width direction X through the second intakes 40 to effectively reduce the amount of foreign substances discharged to the outside of the image forming apparatus.

In the embodiment illustrated in FIG. 10, the common fan 32 is used to suck the foreign substances from the first intakes 30 and the second intakes 40, and the common filter 33 is used to collect the foreign substances. However, a dedicated fan and filter may be used for the second intakes 40, and the fan 32 and the filter 33 may be used for the first intakes 30.

Figure 11:
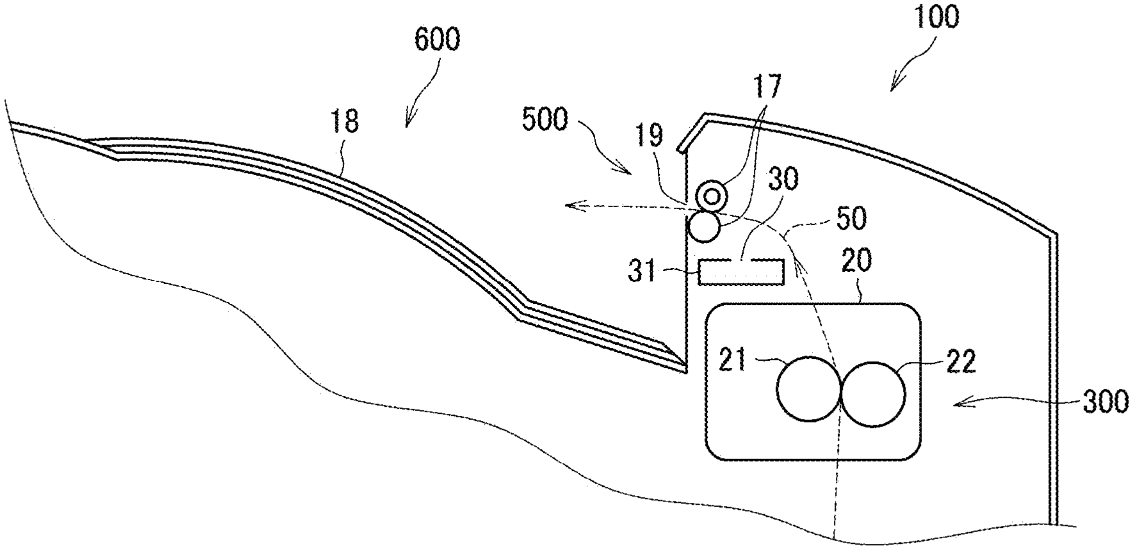
FIG. 11 is an enlarged partial schematic view of a recording medium ejector and a peripheral portion thereof in the image forming apparatus according to a fourth embodiment.

FIG. 11 is an enlarged partial schematic view of a recording medium ejector and a peripheral portion thereof in the image forming apparatus according to a fourth embodiment.

As illustrated in FIG. 11, the first intake 30 in the fourth embodiment is inside the image forming apparatus 100 and sucks the foreign substances generated from the image formation surface of the sheet P. Specifically, the first intake 30 in the present embodiment is disposed below the conveyance passage 50 along which the sheet is conveyed from the fixing device 20 to the output roller pair 17. In other words, the first intake 30 is disposed facing upward so as to face the conveyance passage 50 between the fixing device 20 and the output roller pair 17. Other configurations are basically the same as those of the above-described first embodiment illustrated in FIG. 2.

Figure 12:
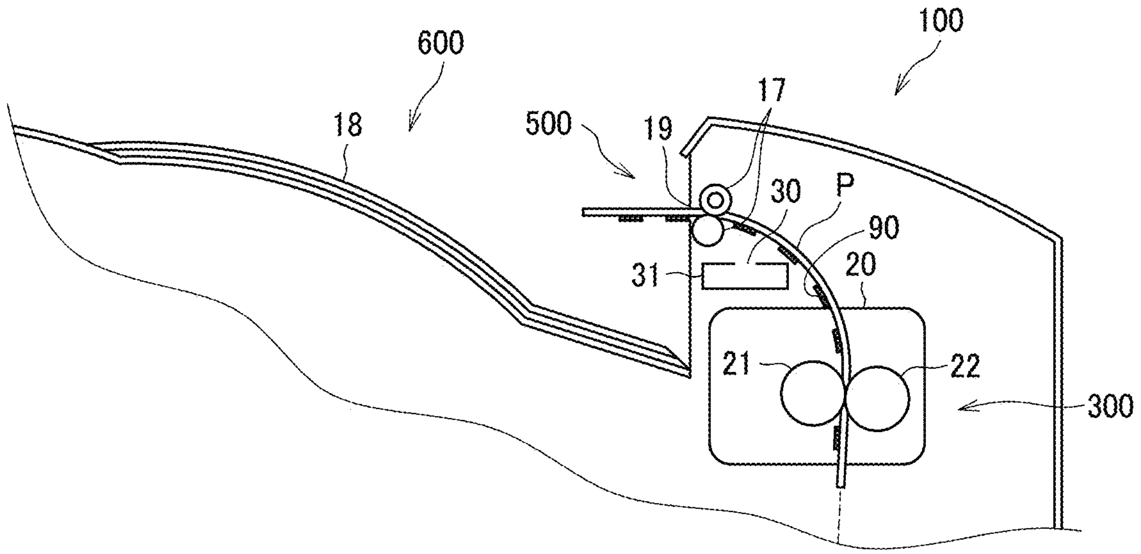
FIG. 12 is an enlarged partial schematic view of a recording medium ejector ejecting a sheet in the image forming apparatus of FIG. 11.

In the fourth embodiment illustrated in FIG. 11, the image formation surface 90 of the sheet P bearing the toner image on one side of the sheet P conveyed from the fixing device to the output roller pair 17 faces the first intake 30 as illustrated in FIG. 12 because the first intake 30 is disposed below the conveyance passage 50 between the fixing device 20 and the output roller pair 17 so as to face the conveyance passage 50 as described above. Since the sheet P is not between the foreign substances generated from the image formation surface 90 and the first intake 30, the foreign substances in the air can be efficiently sucked through the first intake 30. Since the first intake 30 in the fourth embodiment is disposed so as to face the image formation surface 90 of the sheet P passing through the conveyance passage 50 between the fixing device 20 and the output roller pair 17, the air including the foreign substances generated from the image formation surface 90 can be efficiently sucked to effectively reduce and the amount of the foreign substances discharged to the outside of the image forming apparatus.

Since the first intake 30 in the fourth embodiment is disposed inside the image forming apparatus 100, there is no possibility that the first intake 30 is covered by the sheets (that is, the sheet bundle) on the output tray 18. At least a part of the first intake 30 is not required to be disposed above the uppermost sheet of the maximum amount of sheets, and the height of the image forming apparatus 100 can be reduced. As a result, in the fourth embodiment, the size of the image forming apparatus 100 can be reduced in the height direction.

Figure 13:
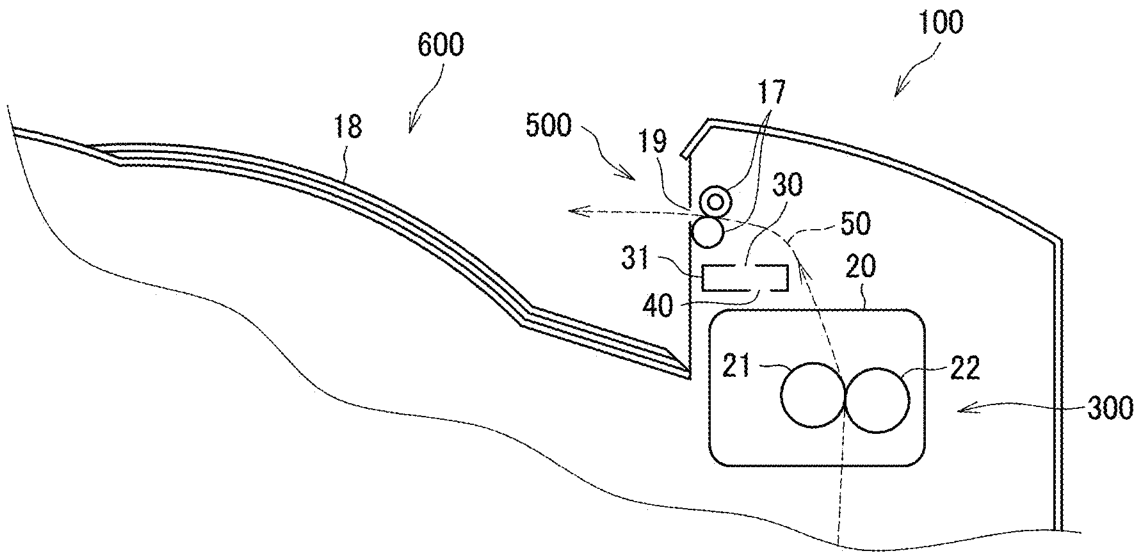
FIG. 13 is an enlarged partial schematic view of a recording medium ejector and a peripheral portion thereof in the image forming apparatus according to a fifth embodiment.

FIG. 13 is an enlarged partial schematic view of a recording medium ejector and a peripheral portion thereof in the image forming apparatus according to a fifth embodiment.

As illustrated in FIG. 13, the first intake 30 in the fifth embodiment is disposed inside the image forming apparatus 100 as in the fourth embodiment illustrated in FIG. 11. The first intake 30 is in the duct 31. In the fifth embodiment, the duct 31 has the second intake 40 to suck the foreign substances generated from the fixing device 20 in addition to the first intake 30.

The above-described configuration can suck and collect the foreign substances in the air generated form the fixing device 20 in addition to the foreign substances in the air generated from the image formation surface of the sheet. As a result, in the present embodiment, the amount of foreign substances discharged to the outside of the image forming apparatus can be farther reduced.

The number and position of the second intake 40 may be appropriately set. As in the third embodiment illustrated in FIG. 10, the second intakes 40 may be disposed so as to face both end portions of the fixing device 20, respectively to effectively suck the foreign substances in the air discharged from both end portions of the fixing device 20.

The first intake 30 and the second intake 40 may be connected to fans and filters, respectively or to a common fan and filter.

In the above description, the embodiments of the present disclosure are applied to the electrophotographic image forming apparatus as illustrated in FIG. 1. However, the present disclosure is not limited to this. Embodiments of the present disclosure may be applied to, for example, an ink jet type image forming apparatus 60 as illustrated in FIG. 14 in addition to the electrophotographic image forming apparatus.

Figure 14:
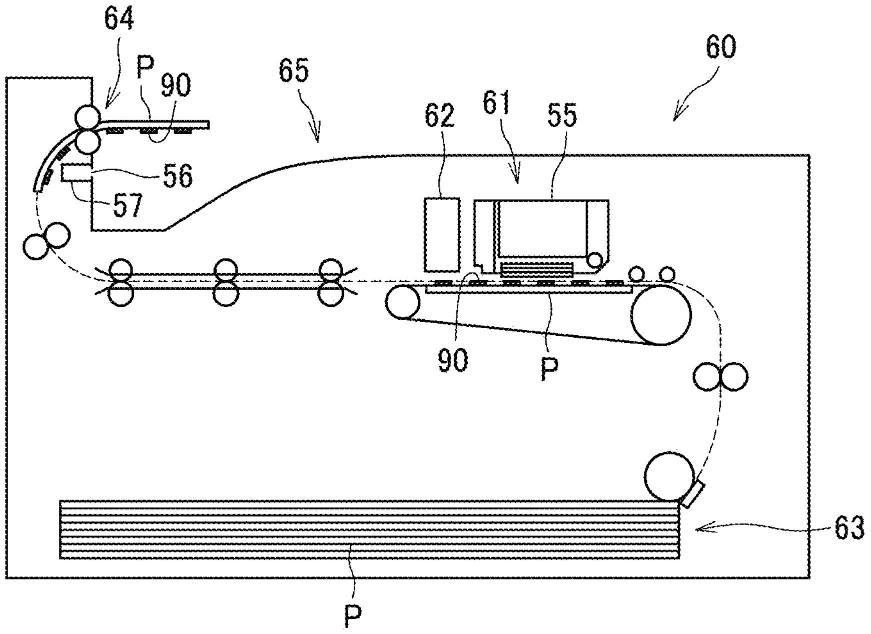
FIG. 14 is a schematic view of an inkjet type image forming apparatus according to an embodiment of present disclosure.

As illustrated in FIG. 14, the ink jet type image forming apparatus 60 includes an image forming device 61, a drying device 62, a recording medium feeder 63, a recording medium ejector 64, and a recording medium tray 65. The image forming device 61 includes a liquid discharge head 55 that discharges ink (liquid) onto the sheet as the recording medium. The drying device 62 is a heating device heating the sheet to dry the ink on the sheet. The recording medium feeder 63 feeds the sheet to the image forming device 61. The recording medium ejector 64 ejects the sheet to an outside of the image forming apparatus 100. The ejected sheet is stacked on the recording medium tray 65.

In the ink jet type image forming apparatus 60, the recording medium feeder 63 feeds the sheet P, and the liquid discharge head 55 discharges ink onto the sheet P to form the image.

Subsequently, the sheet P is conveyed to the drying device 62, and the drying device 62 heats the sheet P to dry the ink on the sheet P. The heating method may be heating by infrared irradiation using a halogen heater or the like, or heating by blowing hot air. Thereafter, the sheet P is ejected from the recording medium ejector 64 to the outside of the ink jet type image forming apparatus and is stacked on the recording medium tray 65.

Since the ink jet type image forming apparatus 60 illustrated in FIG. 14 employs the face-down ejection method, the image formation surface 90 of the sheet P is the lower side of the sheet P when the sheet P bearing the image formed on one side of the sheet P is ejected. Even if volatilization of components contained in the ink on the sheet P generates the foreign substances such as the volatile organic compounds, the fine particles, or the ultrafine particles, the foreign substances can be efficiently sucked through an intake 56 disposed below the recording medium ejector 64 as illustrated in FIG. 14. Thus, the amount of foreign substances discharged to the outside of the image forming apparatus can be effectively reduced as in the above-described embodiments.

In the embodiment illustrated in FIG. 14, the configuration of the first embodiment illustrated in FIG. 2 is applied to the ink jet type image forming apparatus 60. Similarly, the configurations of the other embodiments may be applied to the ink jet type image forming apparatus.

The above-described embodiments of the present disclosure have at least the following aspects.

[First Aspect]

In a first aspect, an image forming apparatus includes a heating device, a recording medium ejector, a recording medium tray, an outer wall having an intake, and a filter. The heating device heats a recording medium having an image on one side of the recording medium. The recording medium ejector ejects the recording medium with the one side facing downward. On the recording medium tray, the recording medium ejected by the recording medium ejector is stacked. The intake opens toward the recording medium tray and is disposed at a position below the recording medium ejector. At the position, a maximum amount of recording media placeable on the recording medium tray does not cover at least a part of the intake. The filter collects foreign substances in air sucked from the intake.

[Second Aspect]

In a second aspect, at least a part of the intake in the image forming apparatus according to the first aspect is above an edge of an uppermost recording medium of the maximum amount of recording media on the recording medium tray, the edge adjacent to the intake.

[Third Aspect]

In a third aspect, an image forming apparatus includes a heating device, a recording medium ejector, a duct having an intake, and a filter. The heating device heats a recording medium having an image on one side of the recording medium. The recording medium ejector ejects the recording medium with the one side facing downward. The intake faces the one side of the recording medium conveyed from the heating device to the recording medium ejector. The filter collects at least one of fine particles or ultrafine particles in air sucked from the intake.

[Fourth Aspect]

In a forth aspect, the image forming apparatus according to the first aspect to the third aspect has other two intakes in the outer wall or the duct. The other two intakes face both end portions of the heating device at both ends of a center portion of the heating device obtained by equally dividing the heating device into three in a width direction of the recording medium.

[Fifth Aspect]

In a fifth aspect, the filter in the image forming apparatus according to the fourth aspect collects the foreign substances or the at least one of fine particles or ultrafine particles in the air sucked from the intake and air sucked from the other two intakes.

[Sixth Aspect]

In a sixth aspect, the image forming apparatus according to the first aspect to the fifth aspect includes a fan. In addition, the image forming apparatus according to the first aspect or the second aspect includes a duct. The fan sucks the air from the intake. The duct guides the air from the intake to an exhaust port. The exhaust port, the fan, and the filter are disposed closer to one end of the duct in a width direction of the recording medium than to a center of the duct in the width direction.

[Seventh Aspect]

In a seventh aspect, the image forming apparatus according to the sixth aspect includes a plurality of intakes in the outer wall or the duct. The plurality of intakes includes the intake and is arranged along the width direction of the recording medium. The duct includes a partition extending from a portion between the intakes toward the exhaust port.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image forming apparatus comprising:

a heating device configured to heat a recording medium having an image on one side of the recording medium;

a recording medium ejector configured to eject the recording medium with the one side facing downward;

a recording medium tray on which the recording medium ejected by the recording medium ejector is stacked;

an outer wall including a first intake, the first intake being open toward the recording medium tray and at a first position below the recording medium ejector, the first position being a position at which a maximum amount of recording media placeable on the recording medium tray does not cover at least a part of the first intake; and a filter configured to collect foreign substances in air sucked into the first intake, wherein the outer wall further includes second and third intakes, the second and third intakes facing both end portions of the heating device, and wherein each of the end portions of the heating device has a length of one third of a total length of the heating device in a width direction of the recording medium orthogonal to a sheet conveyance direction.

2. The image forming apparatus according to claim 1, wherein at least a part of the first intake is above an edge of an uppermost recording medium of the maximum amount of recording media on the recording medium tray, the edge adjacent to the first intake.

3. The image forming apparatus according to claim 1, wherein the filter is further configured to:

collect the foreign substances in the air sucked into the first intake and air sucked into the second and third intakes.

4. The image forming apparatus according to claim 1, further comprising:

a fan configured to suck the air into the first intake; and a duct configured to guide the air from the first intake to an exhaust port, wherein the exhaust port, the fan, and the filter are closer to one end of the duct in the width direction of the recording medium orthogonal to the sheet conveyance direction than to a center of the duct in the width direction orthogonal to the sheet conveyance direction.

5. The image forming apparatus according to claim 4, wherein the outer wall has a plurality of intakes including the first intake, the plurality of intakes arranged along the width direction of the recording medium orthogonal to the sheet conveyance direction; and the duct includes a partition extending from a portion between the plurality of intakes toward the exhaust port.

6. An image forming apparatus comprising:

a heating device configured to heat a recording medium having an image on one side of the recording medium;

a recording medium ejector configured to eject the recording medium with the one side facing downward;

a duct including a first intake configured to face the one side of the recording medium conveyed from the heating device to the recording medium ejector; and a filter configured to collect at least one of fine particles or ultrafine particles in air sucked into the first intake, wherein the duct further includes second and third intakes facing both end portions of the heating device, and each of the end portions of the heating device has a length of one third of a total length of the heating device in a width direction of the recording medium orthogonal to a sheet conveyance direction.

7. The image forming apparatus according to claim 1, further comprising:

a plurality of intakes, the plurality of intakes including the first, second, and third intakes;

a plurality of fans configured to suck air into the plurality of intakes; and a plurality of filters configured to collect foreign substances in the air sucked into the plurality of intakes, the plurality of filters including the filter.

8. The image forming apparatus according to claim 1, further comprising:

a conveyance passage configured to convey the recording medium from the heating device to the recording medium ejector; and a fourth intake in an interior cavity of the image forming apparatus, the fourth intake facing the conveyance passage.

9. The image forming apparatus according to claim 6, wherein the filter is further configured to:

collect the at least one of fine particles or ultrafine particles in the air sucked into the first intake and air sucked into the second and third intakes.

10. The image forming apparatus according to claim 6, further comprising:

a fan configured to suck the air from the first intake of the duct;

the duct has an exhaust port and the duct is configured to guide the air from the first intake to the exhaust port; and the exhaust port, the fan, and the filter are closer to one end of the duct in the width direction of the recording medium orthogonal to the sheet conveyance direction than to a center of the duct in the width direction orthogonal to the sheet conveyance direction.

11. The image forming apparatus according to claim 10, wherein the duct has a plurality of intakes including the first intake, the plurality of intakes arranged along the width direction of the recording medium orthogonal to the sheet conveyance direction; and the duct includes a partition extending from a portion between the plurality of intakes toward the exhaust port.

12. The image forming apparatus according to claim 6, further comprising:

a recording medium tray on which the recording medium ejected by the recording medium ejector is stacked; and at least a part of the first intake is above an edge of an uppermost recording medium of the maximum amount of recording media on the recording medium tray, the edge adjacent to the first intake.

13. The image forming apparatus according to claim 6, further comprising:

a plurality of intakes, the plurality of intakes including the first, second, and third intakes;

a plurality of fans configured to suck air into the plurality of intakes; and a plurality of filters configured to collect foreign substances in the air sucked into the plurality of intakes, the plurality of filters including the filter.

14. The image forming apparatus according to claim 6, further comprising:

a conveyance passage configured to convey the recording medium from the heating device to the recording medium ejector; and the first intake in an interior cavity of the image forming apparatus, the first intake facing the conveyance passage.

15. The image forming apparatus according to claim 14, further comprising:

the second intake and the third intake in the interior cavity of the image forming apparatus; and the first, second, and third intakes being below the conveyance passage, the first intake facing the conveyance passage, and the second and third intakes facing the heating device.

16. The image forming apparatus according to claim 14, further comprising:

a recording medium tray on which the recording medium ejected by the recording medium ejector is stacked; and a fourth intake included in an outer wall of the image forming apparatus, the fourth intake open to the recording medium tray, and the fourth intake at a position below the recording medium ejector.

17. An image forming apparatus comprising:

a heating device configured to heat a recording medium having an image on one side of the recording medium;

a recording medium ejector configured to eject the recording medium with the one side facing downward;

a recording medium tray on which the recording medium ejected by the recording medium ejector is stacked;

an outer wall including a first intake, the first intake being open toward the recording medium tray and at a first position below the recording medium ejector, the first position being a position at which a maximum amount of recording media placeable on the recording medium tray does not cover at least a part of the first intake; and a filter configured to collect foreign substances in air sucked into the first intake;

a fan configured to suck the air into the first intake;

a duct configured to guide the air from the first intake to an exhaust port;

the exhaust port, the fan, and the filter being closer to one end of the duct in a width direction of the recording medium orthogonal to a sheet conveyance direction than to a center of the duct in the width direction orthogonal to the sheet conveyance direction;

the outer wall having a plurality of intakes including the first intake, the plurality of intakes arranged along the width direction of the recording medium orthogonal to the sheet conveyance direction; and the duct including a partition extending from a portion between the plurality of intakes toward the exhaust port.

18. The image forming apparatus according to claim 17, wherein at least a part of the first intake is above an edge of an uppermost recording medium of the maximum amount of recording media on the recording medium tray, the edge adjacent to the first intake.

19. The image forming apparatus according to claim 17, wherein the plurality of intakes further includes second and third intakes, the second and third intakes facing both end portions of the heating device; and each of the end portions of the heating device has a length of one third of a total length of the heating device in the width direction of the recording medium orthogonal to the sheet conveyance direction.

20. The image forming apparatus according to claim 17, further comprising:

a plurality of fans configured to suck air into the plurality of intakes; and a plurality of filters configured to collect foreign substances in the air sucked into the plurality of intakes, the plurality of filters including the filter.

* * * * *